United States Patent [19]

Bendoni

[11] 4,087,831

[45] May 2, 1978

[54] BEARING BLOCK MOUNT FOR A PHOTOGRAPHIC FLUID SPREADING APPARATUS

[75] Inventor: Leonard V. Bendoni, Framingham, Mass.

[73] Assignee: Polaroid Corporation, Cambridge, Mass.

[21] Appl. No.: 773,005

[22] Filed: Feb. 28, 1977

[51] Int. Cl.$^2$ .......................... G03B 17/50; G03D 9/02
[52] U.S. Cl. ........................................ 354/304; 354/86
[58] Field of Search ........................... 354/85, 86, 304

[56] References Cited

U.S. PATENT DOCUMENTS

| 3,797,026 | 3/1974 | Nesson et al. | 354/85 |
| 3,854,809 | 12/1974 | Driscoll | 354/86 |

*Primary Examiner*—John Gonzales
*Attorney, Agent, or Firm*—Kenneth W. Anderson

[57] ABSTRACT

Photographic apparatus for spreading a fluid processing composition in a layer between a pair of superposed sheet elements of a self-developing type film unit to initiate formation of a visible image include a pair of roller type spreader elements having sheet-contacting surfaces rotatably mounted between spaced bearing blocks comprising a unitary piece structured to define first and second rigid sections. The first and second sections are flexibly coupled to facilitate movement of the second section towards and away from the first section. The bearing blocks integrally include means thereon which serve to establish a predetermined minimum spacing between the sheet-contacting surfaces of the spreader elements to facilitate an introduction of a leading edge of the superposed sheet elements therebetween. A spring element is associated with each of the bearing blocks and serves to continuously and resiliently urge the second section toward the first section of the bearing blocks. As the film unit is advanced between the sheet-contacting surfaces of the spreader elements, the second section is pivotally moved thereby away from the first section against the urging of the spring elements whereby one spreader element is displaced away from the other spreader element a distance greater than the predetermined minimum spacing to effect the processing composition dispensing and spreading functions.

11 Claims, 5 Drawing Figures

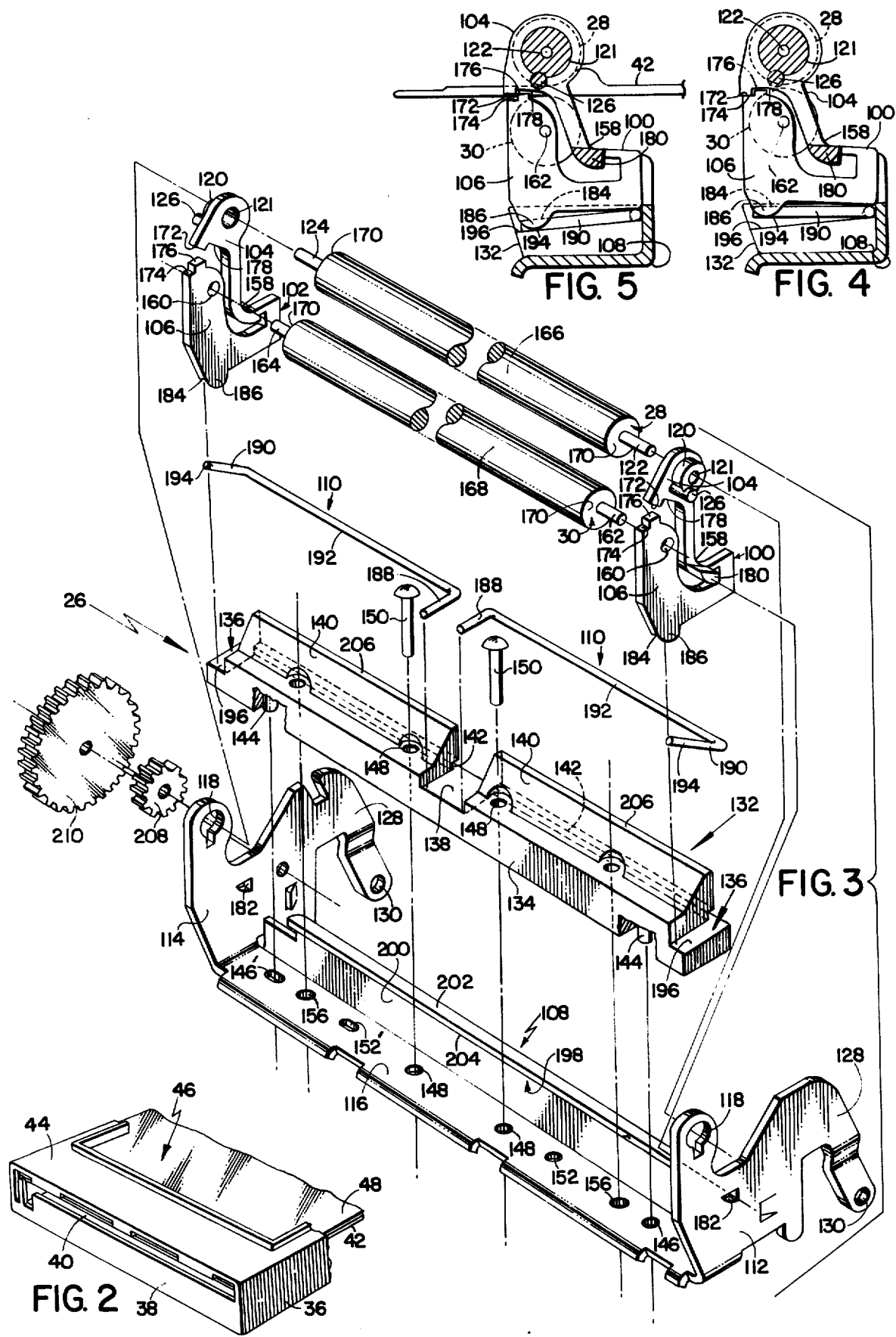

BEARING BLOCK MOUNT FOR A PHOTOGRAPHIC FLUID SPREADING APPARATUS

BACKGROUND OF THE INVENTION

1. Field of the Invention

The present invention relates to photography and, more particularly, to an improved bearing block mount for a photographic fluid spreading apparatus for processing a self-developing type film unit.

2. Description of the Prior Art

Photographic apparatus for spreading a fluid processing composition across an exposed photosensitive sheet element to initiate formation of a visible image by a diffusion-transfer type process is well known in the art. A self-developing type camera having a photographic processing apparatus incorporated therein, designed to be employed with a film unit including a photosensitive image-recording medium in the form of a sheet like element, a second image-receiving element superposed with the photosensitive element and a rupturable container or pod including the fluid processing composition located at one end of the film unit in position to discharge its fluid contents between the two elements for distribution therebetween in response to an application of compressive pressure by the photographic processing apparatus upon the container or pod is also well known in the art. Generally, processing of the film unit is achieved by moving the film unit, container or pod foremost, between a pair of pressure-applying spreader elements preferably juxtaposed rollers having sheet-contacting surfaces in engagement with opposing surfaces of the film unit passing therebetween to distribute the processing composition in a layer between the superposed elements. A typical example of a film unit having all of the especially designed film structure necessary to carry out the aforementioned process as it is progressively advanced between the spreader elements may be found in U.S. Pat. No. 2,543,181 entitled "Photographic Product Comprising A Rupturable Container Carrying A Photographic Processing Liquid", issued to E. H. Land on Feb. 27, 1951 and assigned in common herewith.

In general, the quality of the final image presented to an operator upon a surface of a processed photographic film unit critically depends upon a proper covering of fluid processing composition over a predetermined area between the superposed elements of the film unit in a substantially uniform layer effectively distributed by the spreader elements as the film unit is progressively advanced therebetween. Prior art processing apparatus have employed as spreader elements a pair of juxtaposed non-rolling members, a pair of juxtaposed rotatable members or rollers, and a pair of juxtaposed pressure surfaces including one non-rolling member and one rotatable member. The film units have been generally processed by manually withdrawing them, subsequent to exposure, one at a time between juxtaposed spreader elements or automatically advancing them between a pair of motor driven processing rollers for effecting the processing composition and spreading functions. In either arrangement it is equally important for the sheet-contacting surfaces of the spreader elements to be positioned and retained in precise parallelism with each other and at least one of the juxtaposed sheet-contacting surfaces of the spreader elements must be biased in the direction of the other under a predetermined force to provide sufficient compressive pressure against opposing surfaces of the film unit to rupture the container or pod such that its fluid contents are distributed between the superposed element as the film unit is progressively advanced between the spreader elements. Furthermore, the sheet-contacting surfaces of the spreader elements are preferably provided with a predetermined minimum spacing between the sheet-contacting surfaces to facilitate an initial introduction of a leading edge of the film unit therebetween. While most or all of the foregoing functional requirements have been effectively fulfilled by prior commercially available embodiments of processing apparatus incorporated within known photographic cameras of the self-developing type, there is still a need for an improved processing apparatus from the standpoint of providing a relatively simple design which substantially reduces the manufacturing and assembly costs without sacrificing any of the aforementioned functional requirements.

It is well known that frictional resistance to a sliding motion is substantially greater than a frictional resistance to a rolling motion. If a film unit slides between opposing surfaces being pressed together by a normal force, a frictional force resisting the motion must be overcome. This is of particular concern in a case in which a self-developing type film unit is manually withdrawn for processing between a pair of juxtaposed non-rolling type spreading elements formed of sheet metal parts of the type similar to that disclosed in U.S. Pat. Nos. 3,485,155; 3,498,196 and 3,537,371 wherein the frictional force opposing the sliding movement of the film unit between the spreader elements is arduous and often leads to tearing or mistracking of the film unit in an effort to withdraw the film unit between the spreader elements. Therefore, the use of rollers as substitute spreader elements despite the increased cost involved in incorporating them into a low priced self-developing type photographic camera was deemed necessary. A typical example of a substantially reduced cost roller type processing apparatus for use in such a low priced self-developing type camera is disclosed in U.S. Pat. No. 3,745,904 issued to Herbert A. Bing et al., on July 17, 1953 entitled "Low Cost Roller Type Photographic Fluid Spreading Apparatus". The processing apparatus disclosed therein is directed toward substantially reducing the prohibitive cost of previously known roller type processing apparatus in a low priced camera and thereby substantially lowering the frictional force resisting the movement of the film between the spreader elements by substituting the rolling motion of the rollers for the sliding movement of the film unit between the non-rolling spreader elements to distribute the fluid processing composition. The processing apparatus disclosed therein comprises a pair of rotatable juxtaposed rollers mounted between a pair of spaced rigid bearing blocks having recesses for receiving opposing ends of the rollers therein and spaced to establish a predetermined minimum spacing between the sheet-contacting surfaces of the rollers to facilitate an introduction of the leading edge of the film unit therebetween. Each of the bearing blocks includes a circular recess vertically aligned in superposed relation with an elongated recess for rotatably supporting the opposing ends of the rollers therein. The circular recess supports the uppermost roller in a fixed position against translational movement upon the bearing blocks. The elongated recess rotatably supports the lowermost roller upon the bearing blocks. The length of the elongated recess limits the distance through which the lowermost roller may be displaced from the uppermost roller as the film unit is advanced therebetween for processing. A platform member is adapted to receive the bearing blocks with the rollers rotatably mounted therebetween. The bearing blocks are coupled to the platform member by slidably inserting the bearing blocks into respective channels provided therefor. An especially configured U-shaped load spring element is associated with each of the bearing blocks to resiliently urge the rollers towards each other whereby compressive pressure is applied to opposing surfaces of the film unit by the sheet-contacting surfaces of the film unit for rupturing the container and distributing the released fluid processing composition between the superposed elements. One end of each spring element is mounted beneath each elongated recess and is retained in continuous frictional engagement in bearing against each opposing end of the lowermost roller whereby the lowermost roller is yieldably urged thereby towards the uppermost roller to apply compressive pressure upon the opposing surfaces of the film unit. The lowermost roller is displaced away from the uppermost roller by the film unit as it passes between the rollers. The lowermost roller is moved within the elongated recess against the urging of the spring elements and the ends of the respective spring elements in contact therewith are deflected towards the platform by a distance great enough to enable the film unit to advance therebetween with sufficient pressure being applied to opposing surfaces of the film unit to rupture the pod and spread the released processing composition between the superposed sheet elements of the film unit.

It is well known in the art that the speed at which the film unit is progressively advanced between the rollers critically effects the distribution of the fluid processing composition between the superposed elements i.e., the thickness of the layer of the processing composition and thereby the final development of the photographic print. For example, if the film unit is advanced too rapidly between the rollers, the layer of processing composition deposited between the superposed elements may be too thin and result in a poor quality photographic print. Furthermore, if the film unit is advanced too slowly, the distribution of the processing composition between the superposed elements may be incomplete as the limited supply of fluid included in the container may be exhausted before the processing composition has been uniformly distributed in a layer between the superposed sheet elements. One of the major drawbacks in producing a self-developing camera of the type in which the film unit is manually withdrawn between the spreader elements is the inability to establish the highly unpredictable linear rate at which the film unit shall be withdrawn between the rollers by the operator. Typically, the desired linear rate or pull rate at which the film unit should be withdrawn between the rollers is within the range of 6 to 9 inches per second. However, it has been established that operators generally pull film units as rapidly as 105 inches per second and as slowly as 3 inches per second with a greater majority of the operators pulling the film unit at a rate exceeding 50 inches per second. To compensate for the reduction in friction offered by substituting rollers for the non-rolling spreader members previously employed in such a processing apparatus, the spring elements are deliberately designed to remain in continuous engagement with the opposing ends of the lowermost roller to bear thereagainst and thereby offer at least some resistance to rotation by inducing a drag load against the roller to substantially reduce the speed at which the majority withdraw the film. However, an intentionally induced drag load is not desirable in all designs of all self-developing type cameras and is particularly undesirable in automatic cameras which incorporate motor driven processing spreader elements or rollers to effect the processing composition dispensing and spreading functions.

A processing apparatus including a pair of rollers driveably coupled to a motor drive system for spreading a processing fluid between a pair of sheet materials to initiate formation of a visible image in a film unit is known in the art. The apparatus comprises the pair of rollers, a U-shaped support for rotatably supporting one of the rollers, a pair of bearing blocks for rotatably supporting the other roller and a flat, low rate spring having a plurality of leaf-like members. The U-shaped support includes an open ended elongated slot in each leg thereof which is adapted to slidably receive one of the bearing blocks. The spring engages the base of the U-shaped support and each of the bearing blocks to resiliently urge the two bearing blocks and their associated movable roller towards the other fixed roller rotatably supported on the U-shaped support. A pair of plastic bearings installed in each of the legs for rotatably supporting the fixed roller cooperate with the bearing blocks which function as a keeper for the other fixed roller. Each end portion of the spring is adapted to be received in a recess provided therefor in each of the bearing blocks for applying an upward force to the bearing blocks to bias the roller associated therewith towards the fixed roller. As the film unit enters a gap between the rollers, its thickness results in the bearing blocks being moved downwardly within the elongated slot against the resiliency of the spring.

While the above-noted structure substantially reduces the cost of the processing apparatus by substituting bearing blocks and plastic bearings for metal ball bearing assemblies; there is still room for considerable improvement. For example, the spreader elements are rotatably supported on separate elements of the apparatus with its attendant tolerance stack-up disadvantages. The spring element is a low rate spring having a relatively complex configuration which may be relatively expensive for use in a photographic camera developed for large quantity production. It would appear that a number of parts involved in rotatably supporting the rollers may be further reduced such that remaining parts not only perform their function but also the functions of the parts which were eliminated.

Exemplary disclosures of relatively recent developments in such cameras and film units for use therewith are found in U.S. Pat. No. 3,415,644 entitled "Novel Photographic Products and Processes," U.S. Pat. No. 3,766,842 entitled "Photographic Film Processing Apparatus" and U.S. Pat. No. 3,714,879 entitled "Reflex Camera" all of which are assigned to the assignee of the present invention. When the film units described in the first two of these U.S. Patents are passed between a roller type processing apparatus, a pod-like container is ruptured and a fluid processing composition including an opacifying agent is spread as a layer to provide a background for the photosensitive transfer image evolved during its development outside of the camera. Because the opacifying agent serves as a light shield during the diffusion transfer development process, it is important that the spread of the fluid be properly regulated to insure a smooth and continuous spreading of the processing composition between the sheet elements of the film unit. Such film units are processed in a highly effective manner in which the film unit is generally automatically advanced subsequent to exposure at a predictable predermined linear rate. At least one of the spreader rollers constitutes a drive roller in that it has a spur gear axially coupled thereto which in turn is connected to the motor through an appropriate gear train. Generally, a second one of the pair of rollers constitutes a driven roller in that it is driven by the frictional engagement with the film unit as it is advanced by the drive roller therebetween.

The electrical energy for operating the various automatic systems and the motor drivably coupled to the drive roller is provided by a battery having a limited power supply which upon being substantially diminished can render the camera inoperative. The battery may be included in the camera or as a member of an assemblage of discrete film units stored within a container or cassette of the type disclosed in U.S. Pat. No. 3,967,292 entitled "Film Assemblage Including A Hermetically Sealed Battery" issued on June 29, 1976 to R. M. Delahunt and assigned in common herewith. It is conceivable that by incorporating a processing apparatus of the type disclosed in the aforementioned U.S. Pat. No. 3,745,904 having the drag load deliberately incorporated into its design, an unnecessary amount of energy may be spent in overcoming that drag load. Should the supply of energy be diminished enough to render the camera inoperative before the film supply in the cassette is exhausted, the remaining film units cannot be exposed and processed. Of more serious concern, is the potential damage to the driving components of the roller if any energy supply failure should develop during a partially completed processing cycle. There may be a tendency by some unknowing photographer to pull the film unit manually through the processing spreader elements to remove it from the camera. By substantially reducing the frictional resistance to rotation, battery energy waste and possible overloading of the drive system may be avoided. Therefore, the processing apparatus disclosed in the aforementioned U.S. Pat. No. 3,745,904 may not be suitably adapted to cooperate with an automatic motor power drive system as it would include a compromised drawback to the drive system's operation which would off set the reduction in cost and the simplicity in its design which is associated with producing the prior art device.

The processing apparatus presently employed in the automated reflex camera disclosed for example in the aforementioned U.S. Pat. No. 3,714,879 is similar to the type disclosed in the aforementioned U.S. Pat. No. 3,766,842. The apparatus comprises first and second rotatably mounted juxtaposed elongated rollers which are yieldably urged one towards the other. A pair of annular collars provided on the first roller define a minimum gap between the rollers to facilitate the initial introduction of a leading edge of a film unit therebetween. The first roller is adapted to be selectively driven by a motor of the camera system and when so driven, the annular collars impart a rotary motion to the second roller. Opposing ends of the first and second rollers are rotatably supported within ball bearing assemblies. The second roller consists of a tubular roller shell rotatably mounted upon an elongated shaft extending therethrough and supported at each end by one pair of the spaced ball bearing assemblies which are disposed within the tubular roller shell. An elongated vertically disposed slot is provided to receive opposing ends of the elongated shaft therein whereby the shaft is supported in substantial parallel relation with the first roller for translational movement toward and away from the first roller. A specially configured, elongated, torsion spring is mounted in position to underlie the shaft extending through the second roller. Opposite ends of the torsion spring are configured to seat in appropriately positioned complementary annular recesses provided on the shaft so that the force of the spring remains continually engaged with the shaft to urge the second roller or tubular shell toward the first roller and present thereby a friction load to overcome. It is conceivable that instead of providing a processing apparatus with ball bearing assemblies provided for rotatably supporting a pair of rollers and separate structure, e.g., annular collars, for predeterminately spacing the rollers from each other one could provide a single structure for performing both functions.

Although many of the aforementioned traditional and commercially available processing apparatus have fulfilled the functional and operational requirements for processing a self-developing type film unit, it is of the utmost importance that the cost of such an apparatus be kept as low as possible. One solution to keeping the cost of the processing apparatus to a minimum is to reduce the number of parts in the apparatus such that they not only perform their function but also the functions of the parts which were eliminated.

Accordingly, an object of the present invention therefore, is to provide an improved processing apparatus of the film advancing type for spreading a fluid processing composition in a substantially uniform layer between superposed sheet elements of a self-developing type film unit at least one of which forms part of a film unit.

It is another object of the invention to provide a relatively low-cost processing apparatus employing roller-type spreader elements which is compact and easy to assemble.

A further object of this invention is to provide a processing apparatus of the type indicated which may be utilized to replace a processing apparatus currently employed in commercially available cameras without requiring any alterations to be made to other elements of such cameras and which may be fabricated in a relatively inexpensive operation.

Other objects of the invention will in part be obvious and will in part appear hereinafter. The invention accordingly comprises the apparatus possessing the construction, combination of elements, and arrangement of parts which are exemplified in the following disclosure and the scope of the application which will be indicated in the claims.

SUMMARY OF THE INVENTION

This invention relates to an improved photographic apparatus suitable for use in a variety of self-developing type photographic systems, particularly a type which incorporates a motor driven processing apparatus to effect a fluid processing composition dispensing and spreading function whereby the processing composition is spread in a substantial uniform layer between a pair of superposed sheet elements, at least one of which forms part of a film unit, to initiate formation of a visible image by a diffusion-transfer type process. The invention is adapted to be incorporated as a replacement for a processing apparatus presently incorporated into a commercially available camera, or, may be introduced during production at a cost substantially less than that associated with producing the presently employed processing apparatus.

The apparatus comprises: a pair of bearing blocks having a unitary piece construction structured to define a first and second rigid section, a means for fixedly stationing the first sections of the bearing blocks in spaced apart relation with respect to each other, a first spreader element having an elongated sheet-contacting surface mounted between the spaced first sections, a second spreader element having a sheet-contacting surface mounted between the second sections of the bearing blocks and a means for resiliently biasing the second sections of the bearing blocks toward respective engagement with the first sections. The first and second sections of each of the bearing blocks are interconnected by a thin flexible portion to accomodate pivotal movement of the second section towards and away from engagement with the first section. When the first and second sections are in engagement in response to the urging of the resilient biasing means, the first and second spreader elements are in juxtaposed parallel alignment with each other for compressibly receiving superposed leading edges of the sheet elements therebetween. After the photosensitive sheet element has been exposed and advanced into the gap between the sheet-contacting surfaces of the first and second spreader elements, the thickness of the superposed sheet elements results in the second spreader element being moved away from the first spreader element so as to pivotally move the second section about the respective flexible portions and out of engagement with the first sections for spreading a layer of the processing composition between the sheet elements against the resilient urging of the biasing means as the sheet elements are advanced between the sheet-contacting surfaces of the first and second spreader elements. After the film unit finally moves out of engagement with the sheet-contacting surfaces of the spreader elements, the second section in response to the urging of the resilient biasing means is moved towards engagement with the first section of the bearing blocks to return the spreader elements into the juxtaposed parallel alignment to compressibly receive the next exposed film unit.

BRIEF DESCRIPTION OF THE DRAWINGS

For a fuller understanding of the nature and objects of the invention, reference should be made to the following detailed description taken in connection with the accompanying drawings wherein:

FIG. 2 is a fragmentary, perspective view of a film-laden cassette employed in the photographic apparatus of FIG. 1;

FIG. 3 is an exploded perspective view of a processing apparatus embodying the photographic apparatus of FIG. 1;

FIG. 4 is a fragmentary, sectional side view of the processing apparatus of FIG. 3 assembled and in position to receive an exposed film unit for processing; and FIG. 5 is a fragmentary, sectional, side view of the processing apparatus of FIG. 4 illustrating the relationship between the exposed film unit and the apparatus of the invention as the film unit is being progressively advanced through the apparatus for processing.

DETAILED DESCRIPTION OF THE INVENTION

Figure 1:
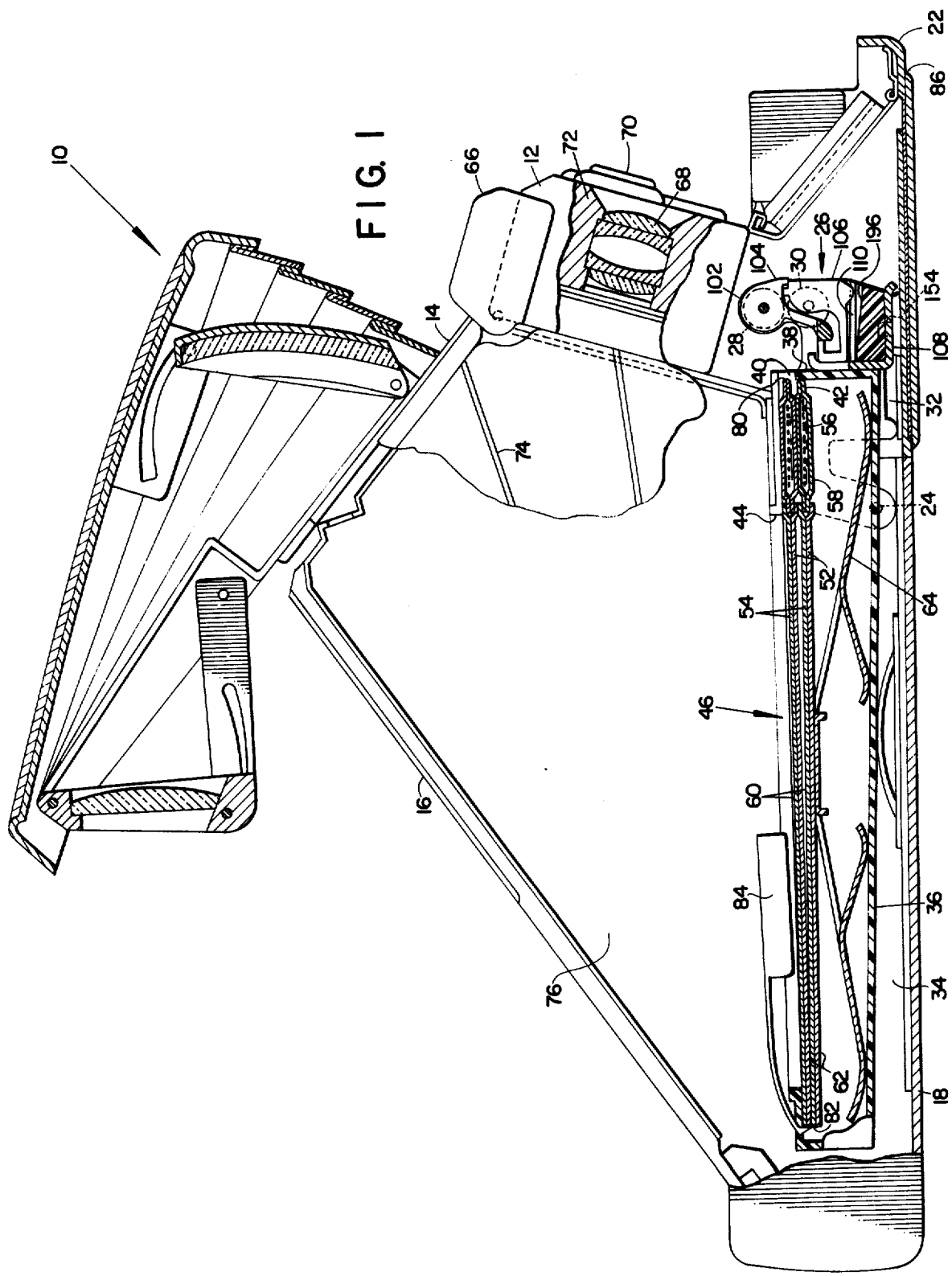
FIG. 1 is a side view, partly in corss-section of a photographic apparatus of the self-developing type embodying the instant invention.

Referring now to FIG. 1 the present invention is depicted as being incorporated in an automatic, compact collapsible photographic camera 10 for use with a self-developing type film unit. More specifically, while the photographic camera may be of any conventional construction, as shown, it clearly resembles a single lens reflex Polaroid SX-70 Land Camera as manufactured and marketed by the Polaroid Corporation of Cambridge, Massachusetts and generally conforms to the camera structure disclosed and described in considerable detail in the aforementioned U.S. Pat. No. 3,714,879. The camera 10 is illustrated in its extended operative condition in FIG. 1. The camera comprises a plurality of housing sections 12, 14, 16 and 18 which are pivotally connected to one another for relative movement between the extended operative condition of FIG. 1 and a compact collapsed condition (not shown). A film loading access door 22 extending in front of housing member 18 is pivotally connected thereto at pivot 24 for movement in a clockwise direction as viewed in FIG. 1 for purposes which will later be described. The film loading access door 22 includes means for mounting a photograhic processing apparatus 26 including juxtaposed spreader members 28 and 30 urged toward one another by a resilient biasing means. The present invention is particularly concerned with the nature of this photograhic processing apparatus 26 which will be discussed in considerable detail hereinafter.

When the camera 10 is disposed in its extended operative condition of FIG. 1 the photographic processing apparatus 26 is positioned across an entrance 32 to a film receiving chamber 34. The pivotal connection between housing member 18 and the film loading access door 22 enables the latter to be rotatably moved with respect to the former to move the photograhic processing apparatus 26 from its blocking position across entrance 32 thereby providing access to the film receiving chamber 34 so that a film cassette 36 may be inserted therein.

The film cassette 36 includes a leading end wall 38 having an elongated slot 40 therein through which a film unit 42 may be advanced subsequent to exposure and a forward wall 44 having a generally rectangular-shaped opening 46 therein through which the film unit 42 may be exposed. The cassette 36 in addition to enclosing a plurality of film units 42, also contains an opaque cover sheet 48 (shown in FIG. 2) for preventing ambient light from exposing the film units 42 during loading of the cassette into the film receiving chamber 34, and preferably a flat battery (not shown) for powering various sub-assemblies of the camera including a film advancing apparatus. A typical example of such a film assembly including a hermetically sealed battery is disclosed and described in detail in the aforementioned U.S. Pat. No. 3,967,292.

The film units 42 are preferably of the type described in the aforementioned U.S. Pat. No. 3,415,644 and are diagrammatically illustrated as including superposed image-receiving and photosensitive systems or sheet elements 52 and 54 respectively between which a fluid processing composition 56, located within a container or pod 58 attached to leading edges of the image-receiving and photosensitive systems 52 and 54, is adapted to be spread to initiate formation of a visible image in the film unit 42. The image-receiving system 52 includes a transparent light transmitting layer 60 preferably formed from Mylar through which the photosensitive system is exposed and the rearwardly facing surface of the latter system is provided with an opaque layer 62. When the film cassette 36 is properly located within the film receiving chamber 34 the rectangular opening 46 becomes positioned therein so that it is aligned with the optical system of the camera 10 to facilitate exposure operations and picture framing. Within the film cassette 36 is a spring assembly 64 which continuously urges the film units 42 toward the rectangular opening 46 so that an uppermost film unit 42 is located in the focal plane of the camera 10 for exposure purposes.

The housing member 12 comprises a housing 66 for the camera's lens assembly 68, an actuator button 70, and a shutter assembly 72, not shown in detail but disposed within housing 66 and comprising suitable electro-optical-mechanical means for determining and regulating exposure intervals. Additionally, housing member 12 in cooperation with housing members 14, 16 and 18 and collapsible bellows 74 form a six-sided exposure chamber 76.

The optical system of the camera 10 in addition to the lens assembly 68 further comprises optical means that cooperate with the lens assembly 68 to provide alternate folded light paths for light rays emanating from the scene and passing through the lens elements of lens assembly 68. Located in housing 66 is a focus wheel (not shown) which when rotated causes a forward-rearward displacement of the lens element in lens assembly 68 thereby permitting the user to adjust the sharpness of the subject matter image.

To initiate the exposure and processing mode of operation of the camera 10, the user depresses actuator butyon 70 located in housing 66. The depression of actuator button 70 engages means, not shown, in the camera which effect a sequential series of camera system operations that ultimately result in a finished photograph. The first of these operations closes a normally open shutter 72 located in housing 66 thus producing an internal lighttight condition in exposure chamber 76. Subsequently, a mirror (not shown) moves from a position covering the focal plane of the camera 10 to a position in which the photosensitive system 54 of the film unit 42 is uncovered to direct light rays coming from the focused subject matter to the film unit 42. The shutter 72 then reopens and the exposure is begun. After an appropriate exposure interval the shutter again closes and the exposure chamber 76 is again in a lighttight condition. At this time, the photosensitive system 54 is automatically recovered by the mirror. The exposed film unit 42 is automatically advanced through the elongated slot 40 of the film cassette 36 and into operative relationship with the photographic processing apparatus 26 whereby the fluid processing composition 56 is distributed in a longitudinal direction from a leading edge 80 to a trailing edge 82 of the film unit 42. The film advancing means comprises a film engaging member 84 which operates in a reciprocating manner so as to engage the trailing edge 82 of the exposed film unit 42 and advance it into engagement with the spreader elements 28 and 30. It is with the interrelationships that occur between the exposed film unit 42 and the photographic processing apparatus 26 which occur during the last sequence of events that is the particular concern of the present invention which will be described in more detail hereinafter. The spreader elements 28 and 30 continue to advance the exposed film unit 42 until it passes through an exit slot 86 whereupon the shutter 72 automatically reopens and the camera 10 returns to a viewing and focusing mode.

Referring now to FIGS. 3 through 5, the photographic processing apparatus 26 comprises: a pair of bearing blocks 100 and 102 each including a first section 104, which provides a support for the rotatable spreader element or roller 28, and a second section 106 for rotatably supporting the spreader element or roller 30, a means for fixedly stationing the first sections of the bearing blocks 100 and 102 in spaced apart relation with respect to each other in the form of a mounting bracket 108 and a means for resiliently biasing the second sections 106 of respective bearing blocks 100,102 toward respective engagement with the first sections 104 in the form of a pair of spring elements 110.

The mounting bracket 108 includes a pair of spaced substantially upright membes 112 and 114 interconnected by an elongated base member 116. Each of the upright members 112 and 114 includes an aperture 118 configured to receive therein an integrally molded bearing portion 120 from one of the first sections 104. Each bearing portion 120 includes a circular recess 121 for rotatably supporting respective opposing cylindrical end sections or journals 122 and 124 of the roller 28. Means for fixedly securing each first section 104 of the bearing blocks 100 and 102 upon their respective upright members 112 and 114 is provided by an integrally molded key portion 126 on each first section 104. Each of the upright members 112 and 114 also includes a rearwardly extending portion 128 having an aperture 130 therein for pivotally connecting the film loading access door 22 and the photographic processing apparatus 26 to the housing member 18 of the main body of the camera 10.

An elongated support member 132 is provided for attachment upon the elongated base member 116 between the upright members 112 and 114 for supportably mounting the resilient biasing means or spring elements 110 on the mounting bracket 108. The support member 132 includes an elongated base 134 having spaced apart supportive platforms 136 disposed at opposing ends thereof, a recess 138 substantially intermediate the opposing ends, and a vertical standing member 140 divided into two sections integrally joined and extending in an upright manner from an upper surface of the base 134. A groove 142 extends longitudinally along one side of the vertical standing member 140 at the intersection of the joined edges of the base 134 and the vertical standing member 140. The base 134 has spaced apart posts 144 depending therefrom and adapted to be received within respective complementary apertures 146, 146' for locating and fixedly attaching the support member 132 to the mounting bracket 108. Aperture 146' has an elliptical configuration whereby the support member 132 may be generally adjusted longitudinally upon the mounting bracket 108 before the support member 132 is fixedly attached upon the elongated base member 116 of the mounting bracket 108 by heat staking the protruding shank portions of the posts 144 extending through the respective apertures 146, 146' to an underlying surface of the base member 116. The support member and the mounting bracket 108 are further provided with circular apertures 148 adapted to receive suitable fasteners 150 for further securing the support member 132 upon the mounting bracket 108. The base member 116 of the mounting bracket 108 and the support member 132 include locating holes 152, 152' adapted to receive locating posts 154 (shown in FIG. 1) protruding from an inner surface of the film loading access door 22 which assist in properly locating the assembled photographic processing apparatus 26 upon the inner surface of the loading access door 22 before suitable fasteners (not shown) are inserted into complementary apertures included in the loading access door and threadably fastened into apertures 156 for securing the photographic processing apparatus 26 upon the inner surfaces of the loading access door 22. Therefore, the photographic processing apparatus 26 may be installed or removed as an integral unit upon the loading access door 22 once the assembly has been completed which will be discussed hereinafter.

The bearing blocks 100 and 102 are each formed as a unitary piece structured to define the first rigid section 104 and the second rigid section 106 which are formed in a relatively inexpensive injection molding process of a suitable wear resistant low friction polymeric plastic material for example such as that sold by Liquid Nitrogen Processing Corp. of Malvern, Pa. under their designation of "Fulton 404". Each first and second rigid section 104 and 106 is interconnected by a thin flexible portion 158 which serves as a means for flexibly coupling each first section 104 to a respective second section 106 to accomodate pivotal movement of each second section 106 towards and away from engagement with a corresponding first section 104. Each of the second sections 106 includes a circular recess 106 for rotatably receiving respective cylindrical end sections 162 ad 164 of the spreader element or roller 30. The circular recess 121 included within the bearing portion 120 of each of the first sections 104 and the circular recess 160 included within each of the second sections 106 of the bearing blocks 100 and 102 provide a means for receiving and rotatably supporting the spreader elements 28 and 30 in juxtaposed parallel alignment with each of the second sections 106 are in engagement with a respective one of the first sections 104 of the bearing blocks 100 and 102 and when each of the first sections 104 is fixedly stationed upon its respective upright member 112 or 114 in spaced apart relation with respect to the other first section 104.

The two spreader elements 28 and 30 are substantially identical in configuration. Spreader element 28 is provided with a sheet-contacting facing surface 166 and has end portions comprising the cylindrical end sections 122 and 124 of reduced diameter. Spreader element 30 is provided with a sheet-contacting facing surface 168 and has end portions comprising the cylindrical end sections 162 and 164 of reduced diameter thereon. The width of the elongated sheet-contacting surfaces 166 and 168 of the spreader elements 28 and 30 respectively is selected to be substantially equivalent to the width of the film unit 42. The abrupt change in the size of the reduced diameters of the end sections 122, 124 and 162, 164 adjacent each opposing end of the sheet-contacting surfaces 166 and 168 respectively provides a shoulder or restricting means 170 which in combination with the circular recesses 121 and 160 serve to limit lateral movement of the spreader elements 28 and 30 upon the bearing blocks 100 and 102. It will be noted that the bearing portions 120 when mounted within respective apertures 118 of the spaced upright members 112 and 114 function as a thrust bearing for the spreader element 28. In this regard it will also be noted that the facing surfaces of the bearing blocks 100 and 102 including the circular recesses 160 are function as thrust bearings for the spreader element 30.

The bearing blocks 100 and 102 also include means for providing a minimum spacing between the sheet-contacting surfaces 166 and 168 of the spreader elements 28 and 30 to facilitate an introduction therebetween of the leading edge 80 of the superposed sheet elements 52 and 54 of the film element 42 when the first sections 104 and the second sections 106 are respectively engaged to each other. The means for providing such minimum spacing functions simultaneously to prevent forces exerted by the resilient biasing means from acting directly upon the spreader element 30 thereby providing a generally no-load condition on the spreader elements 28 and 30 whereby they may be freely rotated to facilitate cleaning of the spreader elements 28 and 30. Specifically, the predetermined minimum spacing means takes the form of a first specially configured integrally molded projection 172 depending from each first section 104 in the direction of a respective first complementary engaging surface 174 integrally molded upon each second section 106. A second specially configured integrally molded projection 176 extending vertically upward from each second section 106 in the direction of a second complementary engaging surface 178 is integrally molded on each first section 104 of each of the bearing blocks 100 and 102. The first specially configured projection 172 is located upon each first section 104 for sustained engagement with the second specially configured projection 172 during the pivotal movement of each second section 106 away from each respective first section 104 as each second section 106 is moved away from each respective first section 104 by a distance greater than the predetermined minimum spacing established during the engagement between respective first and second sections 104 and 106. This sustained engagement serves to preclude the film unit 42 from urging the second section 106 along with the film unit 42 as it is advanced between the sheet-contacting surfaces 166 and 168 of the rollers 28 and 30 respectively during the spreading of the fluid processing composition 56 between the sheet elements 52 and 54.

The first section 104 of each of the bearing blocks 100 and 102 is provided with the key portion 126 and another means such as an integrally molded projection 180 for fixedly securing each first section 104 upon a respective upright member 112 or 114 of the mounting bracket 108. Each of the upright members 112 and 114 includes a mounting aperture 182 which is adapted to receive a respective projection 180 therein. The key portions 126 and the projections 180 are adapted to extend respectively through apertures 118 and 182 whereby their protruding ends may be heat staked or ultrasonically welded to swage over the protruding shank portions and form a head thereon against the outer surfaces of the upright members 112 and 114 to fixedly attach respective first sections 104 of the bearing members 100 and 102 thereon. The second sections 106 remain unattachably suspended upon the mounting bracket 108 for pivotal movement about their respective flexible portions 158 toward and away from the first section 104. When rotatably mounted between the first sections 104 of the bearing blocks 100 and 102, the spreader element 28 is fixedly positioned against translational motion with respect to the bearing blocks 100 and 102 and the mounting bracket 108. The key portion 126 and the projection 180 of each first section 104 further serve to preclude rotational movement of each first section 104 upon its upright member 112 or 114 as each second section 106 is pivotally moved toward and away from a respective first section 104. A specially configured recess 184 is provided within a projecting portion 186 depending from each second section 106 of the bearing blocks 100 and 102 for respectively receiving and retaining a portion of the spring elements 110 therein.

The spring elements 110 provide the means for resiliently biasing the second sections 106 of the bearing blocks 100 and 102 toward respective engagement with the first sections 104. Specifically, the spring elements 110 include a pair of simple torsion spring elements each including spaced apart first and second end portions 188 and 190 respectively, connected by an elongated section 192. The first end portion 188 and the elongated section 192 of each spring element 110 define a first plane and are adapted to engage the surfaces of the intermediate recess 138 and the groove 142 respectively of the support member 132. The second end portion of each spring element 110 is off set at an acute angle from the first plane. The second end portion 190 of each spring element 110 is adapted to be received within a respective recess 184 in each of the bearing blocks 100 and 102 for exerting a force against each second section 106 and urging each second section 106 towards engagement with a respective first section 104.

When the photographic apparatus 26 is assembled, the elongated sections 192 of the spring elements 110 are inserted respectively into the grooves 142 of the support member 132 with the first end portions 188 supported upon the surface of the intermediate recess 138. The end of each of the second end portions 190, directly adjacent to a respective elongated section 192, is supportably engaged by a respective supportive platform 136. A portion 194 of each second end portion 190 extends above an underlying inclined surface 196 of each supportive platform 136 and is deflectably inserted into respective complementary configured recess 184 for resiliently biasing each of the second sections 106 of the bearing blocks 100 and 102. The spring elements 100 are preloaded by the deflection of the second end portions 190 downwardly in the direction of respective inclined surfaces 196 of the supportive platforms 136 during the assembly. A torsional moment is introduced thereby to the spring elements 110 which produces a bending stress therein to rotate the elongated sections 192 within the groove 142. Each elongated section 192 is precluded from rotating therein by its respective first end portion 188 being forced by the bending stress to bear against the surface of the intermediate recess 138. Put another way, one end of the elongated section 192 of each spring 110 closely adjacent to the first end portion 188 may be viewed as being fixed and a second end thereof closely adjacent to the seecond end portion 190 may be viewed as being twisted by the deflection of the second end portion 190 upon its insertion into a respective complementary recess 184. This deflection provides an upward force against the second sections 106 to urge the second sections 106 towards engagement with respective first sections 104 thereby moving the spreader element 30 into juxtaposed parallel alignment with the spreader element 28. The terms "downwardly" and "upward" are used herein with respect to the orientation of various elements as depicted in the drawings for explanatory purposes only and should not be construed in any limiting sense.

An elongated upright 198 is provided upon the base member 116 of the mounting bracket 108 for locating and supportably preventing movement of the spring elements 110 out of the groove 142 when the support member 132 is placed upon the base member 116 of the mounting bracket 108. The elongated upright 198 includes an upright member 200 extending between the base member 116 and an overhanging member 202 which extends in a parallel plane with the base member 116 from the upright member 200. The overhanging member 202, in its superposed relation with the uppermost surfaces 206 of the vertical standing members 140, serves to preclude vertical lifting of the support member 132 from the base member 116 of the mounting bracket 108. The support member 132 is mounted upon the base member 116 with the sides of the vertical standing members 140 bearing against the upright member 200. The elongated sections 192 of the spring elements 110 are also retained within the grooves 142. Therefore, it will be noted that the mounting bracket 108, the elongated support member 132 and the bearing blocks 100 and 102 in combination comprise a means for retaining the resilient biasing means or spring elements 110 in position upon the support member 132.

After the film unit 42 has been exposed, the motor driven film engaging member 84 engages the trailing edge 82 of the exposed film unit 42 and moves it through the elongated slot 40 and into the gap defined by the predetermined minimum spacing between the sheet-contacting surfaces 166 and 168 of the spreader elements 28 and 30 respectively. The spreader element 28 constitutes a drive roller in that it has a spur gear 208 axially coupled thereto which in turn is coupled to an electric motor (not shown) through an appropriate gear train not shown in its entirety but comprising a pinion gear 210. The spur gear 208 is adapted to be secured by suitable means to the cylindrical end section 124 of the spreader element 28.

Referring now to FIGS. 4 and 5 of the drawings, the nature of the operation of the photographic processing apparatus 26 is shown. In FIG. 4, the second sections 106 are shown urged into engagement with the first sections 104 in response to the biasing of the spring elements 110. The predetermined minimum spacing between the sheet-contacting surfaces 166 and 168 of the spreader elements 28 and 30 for facilitating the introduction of the leading edge 80 of the exposed film unit 42 therebetween is shown defined by the respective engagement of the first and second specially configured projections 172 and 176, with the first and second complementary engaging surfaces 174 and 178. Once the film unit 42 enters the gap between the spreader elements 28 and 30, its thickness results in the spreader element 30 being moved downwardly against the bias of the spring elements 110 away from the spreader element 28 a distance greater than the predetermined spacing whereby the second sections 106 are pivotally moved about their respective flexible portions 158 and out of engagement with their respective first sections 104. The spreader elements 28 and 30 produce sufficient compressive pressure upon the container or pod 58 attached to the leading end portion of the film unit 42 to rupture it and distribute the released fluid processing composition 56 between the image receiving system and the photosensitive system 52 and 54 as the film unit 42 is being advanced between the sheet-contacting surfaces 166 and 168 of the spreader elements 28 and 30 as shown in FIG. 5.

Generally, the entire length of the second end portion 190 of each spring element 110 is deflected downwardly to bear against the inclined surface 196 of each supportive platform 136 in response to the pivotal movement of the second sections 106 out of engagement with their respective first sections 104. The inclined surface 196 operates to limit the deflection of the second end portion 190 of each spring element 110 as the film unit 42 is advanced between the sheet-contacting surfaces 166 and 168 to preclude an overstressing of the spring elements 110 and to assure that the compressive pressure generated thereby is sufficient to rupture the container or pod 58 and properly distribute the released fluid processing composition 56 between the image receiving and photosensitive systems 52 and 54 for processing the film unit 42. As the trailing edge 82 of the film unit 42 emerges from between the sheet-contacting surfaces 166 and 168 of the spreader elements 28 and 30, a portion of the exposed film unit 42 also emerges from the photographic camera 10 via the exit slot 86 in the film loading access door 22. At that time, the second sections 106 in response to the urging of the spring elements 110 are pivotally moved about their respective flexible portions 158 into engagement with their respective first sections 104 whereby the sheet-contacting surfaces 166 and 168 of the spreader elements 28 and 30 are moved back into juxtaposed parallel alignment with the predetermined minimum spacing again defined between their respective surfaces to facilitate the introduction of the leading edge 80 of the next exposed film unit 42 therebetween.

The advancement of the film unit 42 through the photographic processing apparatus 26 may be facilitated by providing at least one of the spreader elements, preferably the drive roller 28, with a relatively high friction film drive characteristic. In this context, it is desirable that the relatively high friction be provided by elastomeric types of materials such as urethane or rubber. Specifically, the sheet-contacting surface 164 of the spreader element 28 may comprise a thin coating of urethane or rubber applied by any suitable process.

One of the advantages of the present invention is that it provides a reliable photographic processing apparatus at a substantially reduced cost over the present processing apparatus used in the Polaroid SX-70 Land Camera. The number of relatively expensive piece parts used in the prior art apparatus have been substantially reduced. For example, the ball bearing assemblies for rotatably supporting opposing ends of the spreader elements have been replaced by the injection molded plastic bearing blocks. The means for establishing the predetermined minimum spacing between the sheet-contacting surfaces of the spreader elements are provided upon the first and second sections of the unitary bearing blocks in the present invention as compared with the machined annular collars provided upon opposing ends of at least one of the rollers in the prior art apparatus. The torsion spring used in the prior apparatus, the extruded, hollow roller and the shaft for rotatably mounting the extruded roller thereon have been respectively replaced with relatively simple torsion springs and interchangeable solid cylindrical spreader elements which are relatively inexpensive. Therefore, it should be apparent to those skilled in the art that the photographic processing apparatus of the present invention generally reduces the number of piece parts used to provide a reliable processing apparatus for photographic cameras produced for the mass amateur market. The relatively simple design and reduced number of parts serve to substantially reduce the time which may be consumed in assembling the processing apparatus. Therefore, the present invention enables the photographic camera to remain generally competitive in price, perform all the functions of a conventional type camera, and provide a film processing capability. Furthermore, most importantly, the photographic processing apparatus of the present invention may be readily attached and removed as an integral unit from the photographic camera and used as a replacement for the similar prior art processing apparatus currently in use in the aforementioned commercially available cameras without otherwise altering the cameras.

The invention may be practiced or embodied in still other ways without departing from the spirit and essential character thereof. The preferred embodiment described herein in therefore to be considered illustrative and not restrictive, the scope of the invention being indicated by the appended claims and all variations which come within the meaning of the claims are intended to be embraced therein.

What is claimed is:

1. A photographic apparatus for providing a processing operating wherein a fluid processing composition is spread in a substantially uniform layer between a pair of superposed sheet elements at least one of which forms part of a film unit, comprising:
    a pair of bearing blocks, each of said bearing blocks comprising a unitary piece structured to define first and second rigid sections interconnected by a thin flexible portion to accommodate pivotal movement of said second section towards and away from engagement with said first section;
    means for fixedly stationing said first sections of said bearing blocks in spaced apart relation with respect to each other;
    a first spreader element including an elongated sheet contacting surface mounted between said spaced first sections of said bearing blocks;
    a second spreader element including an elongated sheet-contacting surface mounted between said second sections of said bearing blocks whereby said second spreader element, in response to pivotal movement of said second sections about said respective flexible portions into engagement with said respective first sections, is moved into juxtaposed parallel alignment with said first spreader element to compressibly receive superposed leading edges of the sheet elements, between said sheet-contacting surfaces, said second spreader element moving away from said first spreader element so as to pivotally move said second sections about said respective flexible portions out of engagement with said respective first sections, for spreading the layer of processing composition between the sheet elements in response to said sheet elements advancing between said sheet-contacting surfaces; and
    means for resiliently biasing said second sections of said bearing blocks toward respective engagement with said first sections whereby said second spreader element is urged into said juxtaposed parallel alignment with said first spreader element.

2. The photographic apparatus as defined in claim 1 wherein said biasing means comprises at least one spring element resiliently engaged directly to at least one of said bearing blocks.

3. The photographic apparatus as defined in claim 1 wherein said bearing blocks are plastic.

4. Photographic apparatus as defined in claim 1 whereby said first and second sections when engaged to each other provide for a predetermined minimum spacing between said juxtaposed sheet-contacting surfaces of said first and second spreader elements to facilitate an introduction therebetween of a leading edge of the superposed sheet elements.

5. Photographic apparatus as defined in claim 3 wherein said first and second sections include respectively at least one specially configured projection and complementary configured engaging surface for determining said minimum spacing.

6. Photographic apparatus as defined in claim 1 wherein said stationing means comprises a mounting bracket having a pair of spaced substantially upright members connected by an elongated base member.

7. Photographic apparatus as defined in claim 6 further comprising an elongated support member attached to said base member extending between said upright members for supportably mounting said resilient biasing means thereon wherein said mounting bracket, said elongated support member and said bearing blocks in combination comprise a means for retaining said resilient biasing means in position upon said support member.

8. Photographic apparatus as defined in claim 7 wherein said resilient biasing means includes at least two torsion spring elements each having spaced opposing ends connected by an elongated section, at least one of said ends being off set from said elongated section for exerting a force against said second section of said bearing blocks and urging said second section towards engagement with said first section.

9. Photographic apparatus as defined in claim 8 wherein said second sections of said bearing blocks respectively include complementary configured recesses for respectively receiving said off set ends of said spring elements therein and said elongated support member includes: a platform disposed at opposing ends thereof for supportably underlying respective offset ends of said spring elements positioned within said complementary recess, a groove for receiving said elongated horizontal sections of said spring elements therein and a recess for supporting said ends opposite to said off set ends of said spring elements therein to preclude rotational movement of said spring element ends opposite to said off set ends upon said support member whereby a force is established for urging said second sections toward said first sections of said bearing blocks.

10. Photographic apparatus as defined in claim 1 wherein: said first and second spreader elements respectively comprise a roller type spreader element having cylindrical end sections included thereon adjacent each opposing end of said sheet-contacting surfaces whereby said first spreader element is rotatably mounted between siad first sections and said second spreader element is rotatably mounted between said second sections of said bearing blocks and wherein said first and second sections of said bearing blocks include means for receiving and rotatably supporting said cylindrical end sections of said roller type spreader elements therein.

11. Photographic apparatus as defined in claim 10 wherein said cylindrical end sections include a restricting means adjacent each end of said sheet-contacting surfaces which in combination with said receiving and supporting means serve to limit lateral movement of said spreader element upon said mounting bracket.

* * * * *